United States Patent
Keum et al.

(10) Patent No.: US 12,022,009 B2
(45) Date of Patent: Jun. 25, 2024

(54) METHOD AND DEVICE FOR PERFORMING ACCESS CONTROL BY USING AUTHENTICATION CERTIFICATE BASED ON AUTHORITY INFORMATION

(71) Applicant: Samsung Electronics Co., Ltd., Gyeonggi-do (KR)

(72) Inventors: Jieun Keum, Gyeonggi-do (KR); Oleksandr Andrieiev, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 247 days.

(21) Appl. No.: 17/770,481

(22) PCT Filed: Oct. 21, 2020

(86) PCT No.: PCT/KR2020/014407
§ 371 (c)(1),
(2) Date: Apr. 20, 2022

(87) PCT Pub. No.: WO2021/080316
PCT Pub. Date: Apr. 29, 2021

(65) Prior Publication Data
US 2022/0400015 A1    Dec. 15, 2022

(30) Foreign Application Priority Data
Oct. 25, 2019    (KR) .................. 10-2019-0134102

(51) Int. Cl.
*H04L 29/06* (2006.01)
*H04L 9/08* (2006.01)
*H04L 9/32* (2006.01)

(52) U.S. Cl.
CPC .......... *H04L 9/3263* (2013.01); *H04L 9/0825* (2013.01); *H04L 9/3247* (2013.01); *H04L 9/3297* (2013.01)

(58) Field of Classification Search
None
See application file for complete search history.

(56) References Cited

U.S. PATENT DOCUMENTS

| 8,837,724 B2 | 9/2014 | Rose et al. |
| 9,483,631 B2 | 11/2016 | Lowe |
| (Continued) | | |

FOREIGN PATENT DOCUMENTS

| KR | 1020100122964 | 11/2010 |
| KR | 1020180123091 | 11/2018 |

OTHER PUBLICATIONS

Furtado, Matthew D. et al. Threat Analysis of the Security Credential Management System for Vehicular Communications. 2018 IEEE International Symposium on Technologies for Homeland Security (HST). https://ieeexplore.ieee.org/stamp/stamp.jsp?tp=&arnumber=8574206 (Year: 2018).*

(Continued)

*Primary Examiner* — Jeremiah L Avery
(74) *Attorney, Agent, or Firm* — The Farrell Law Firm, P.C.

(57) ABSTRACT

The present disclosure relates to a method and device for performing access control by authenticating an electronic device and performing secure ranging. The method may include: receiving, from a server, a device certificate including a first scrambled timestamp sequence (STS) code encrypted by a public key of the electronic device and a second STS code encrypted by an STS key; transmitting the device certificate to a target device; obtaining the first STS code by decrypting the encrypted first STS code by using a secret key of the electronic device; and performing secure ranging with the target device by using the first STS code.

15 Claims, 15 Drawing Sheets

(56) References Cited

U.S. PATENT DOCUMENTS

| | | | |
|---|---|---|---|
| 10,521,581 B1* | 12/2019 | Anjali | H04L 63/104 |
| 10,559,149 B1* | 2/2020 | Kuechler | G07C 9/00309 |
| 10,721,064 B2* | 7/2020 | Fay | H04L 9/0841 |
| 2011/0131406 A1* | 6/2011 | Jones | H04L 63/061 |
| | | | 713/150 |
| 2014/0003343 A1* | 1/2014 | Kwon | H04W 12/106 |
| | | | 370/328 |
| 2014/0019752 A1* | 1/2014 | Yin | H04L 63/0435 |
| | | | 726/6 |
| 2015/0006404 A1* | 1/2015 | Beidl | H04L 63/0823 |
| | | | 705/71 |
| 2015/0271144 A1* | 9/2015 | Ronca | H04L 9/0891 |
| | | | 713/168 |
| 2015/0318986 A1* | 11/2015 | Novak | H04L 9/0894 |
| | | | 713/189 |
| 2016/0119307 A1* | 4/2016 | Zollinger | H04L 63/08 |
| | | | 726/4 |
| 2017/0289139 A1 | 10/2017 | Guo et al. | |
| 2018/0191728 A1 | 7/2018 | Kim et al. | |
| 2018/0324176 A1* | 11/2018 | Campagna | H04L 63/0435 |
| 2018/0343127 A1* | 11/2018 | Campagna | H04L 9/0825 |
| 2019/0116619 A1 | 4/2019 | Hauck et al. | |
| 2019/0243963 A1* | 8/2019 | Soriente | H04L 9/3247 |
| 2019/0372758 A1* | 12/2019 | Tevosyan | H04L 9/0891 |
| 2019/0372764 A1* | 12/2019 | Fay | H04L 9/0844 |
| 2020/0021447 A1* | 1/2020 | Ih | H04L 9/3073 |
| 2021/0014674 A1* | 1/2021 | Tsai | H04L 63/0428 |

OTHER PUBLICATIONS

Liu, Jingwei et al. A Novel Secure Authentication Scheme for Heterogeneous Internet of Things. ICC 2019—2019 IEEE International Conference on Communications (ICC). https://ieeexplore.ieee.org/stamp/stamp.jsp?tp=&arnumber=8761951 (Year: 2019).*

Park, Sung-Su et al. Application of a HID certificate issue algorithm for strengthening private information security over the V2V environment. 2017 International Conference on Information Networking (ICOIN). https://ieeexplore.ieee.org/stamp/stamp.jsp?tp=&arnumber=7899558 (Year: 2017).*

Frank Leong et al., "HRP UWB SRDEV PPDU Text Contribution", IEEE P802.15 Working Group for Wireless Personal Area Networks (WPANs), Jul. 5, 2018, 17 pages.

International Search Report dated Jan. 25, 2021 issued in counterpart application No. PCT/KR2020/014407, 15 pages.

\* cited by examiner

METHOD AND DEVICE FOR PERFORMING ACCESS CONTROL BY USING AUTHENTICATION CERTIFICATE BASED ON AUTHORITY INFORMATION

PRIORITY

This application is a National Phase Entry of PCT International Application No. PCT/KR2020/014407, which was filed on Oct. 21, 2020, and claims priority to Korean Patent Application No. 10-2019-0134102, which was filed on Oct. 25, 2019, the entire contents of each of which is incorporated herein by reference.

TECHNICAL HELD

The present disclosure relates to a method and device for authenticating an electronic device, and more particularly, to a method and device for authenticating an electronic device by using a certificate based on role (authority) information and performing secure ranging.

BACKGROUND ART

As personalized electronic devices, such as smartphones and tablet personal computers (PCs), become popular, technologies for performing security, authentication, and the like by using a digitized virtual key, that is, a digital key, are under development. As one of such digital key technologies, a technology for integrating a digital key into an electronic device, for example, a smartphone, by using a wireless communication technology is under development.

By inserting a digital key into an electronic device, a user of the electronic device may open and close a door by using the digital key, in replacement of a physical key. In addition, as the function of the digital key is further expanded, the user of the electronic device may use the digital key to access and control devices.

The use of digital keys may bring great improvements in user convenience and industrial effectiveness, but security concerns are also raised. Due to the nature of digital keys that require connection with electronic devices, the electronic devices may be exposed to risks such as hacking. Therefore, it is necessary to process digital keys in a high-security area.

In addition, in the field of a physical access control systems, there is a need for a method of performing secure ranging by immediately generating a digital key while maintaining the above-described security level.

DESCRIPTION OF EMBODIMENTS

Technical Problem

The present disclosure provides a method and device for authenticating an electronic device.

Solution to Problem

An operating method of an electronic device, according to an embodiment of the present disclosure, may include: receiving, from a server, a device certificate including a first scrambled timestamp sequence (STS) code encrypted by a public key of the electronic device and a second STS code encrypted by an STS key; transmitting the device certificate to a target device; obtaining the first STS code by decrypting the encrypted first STS code by using a secret key of the electronic device; and performing secure ranging with the target device by using the first STS code.

An operating method of a target device, according to an embodiment of the present disclosure, may include: receiving, from an electronic device, a device certificate including an STS code encrypted by an STS key and a first STS code encrypted by a public key of the electronic device; obtaining the second STS code by decrypting the encrypted second STS code by using the STS key; and performing secure ranging with the electronic device by using the second STS code.

An operating method of a server, according to an embodiment of the present disclosure, may include: receiving, from an electronic device, a certificate signing request (CSR) including role information of the electronic device with respect to a target device; identifying the CSR and policy information relating to an authority of the electronic device; generating, based on a result of the identifying, a device certificate including a first STS code encrypted by a public key of the electronic device and a second STS code encrypted by an STS key; and transmitting the device certificate to the electronic device.

An electronic device according to an embodiment of the present disclosure may include: a communicator configured to communicate with a server and a target device; a memory configured to store at least one instruction; and at least one processor configured to control the electronic device by executing the at least one instruction. The at least one processor may be further configured to: receive, from the server, a device certificate including a first STS code encrypted by a public key of the electronic device and a second STS code encrypted by an STS key; transmit the device certificate to the target device; obtain the first STS code by decrypting the encrypted first STS code by using a secret key of the electronic device; and perform secure ranging with the target device by using the first STS code.

A target device according to an embodiment of the present disclosure may include: a communicator configured to communicate with an electronic device; a memory configured to store at least one instruction; and at least one processor configured to control the target device by executing the at least one instruction. The at least one processor may be further configured to receive, from the electronic device, a device certificate including a second STS code encrypted by an STS key and a first STS code encrypted by a public key of the electronic device; obtain the second STS code by decrypting the encrypted second STS code by using the STS key; and perform secure ranging with the electronic device by using the second STS code.

Advantageous Effects of Disclosure

According to the present disclosure, a method and device for authenticating an electronic device may be provided.

BEST MODE

Figure 1:
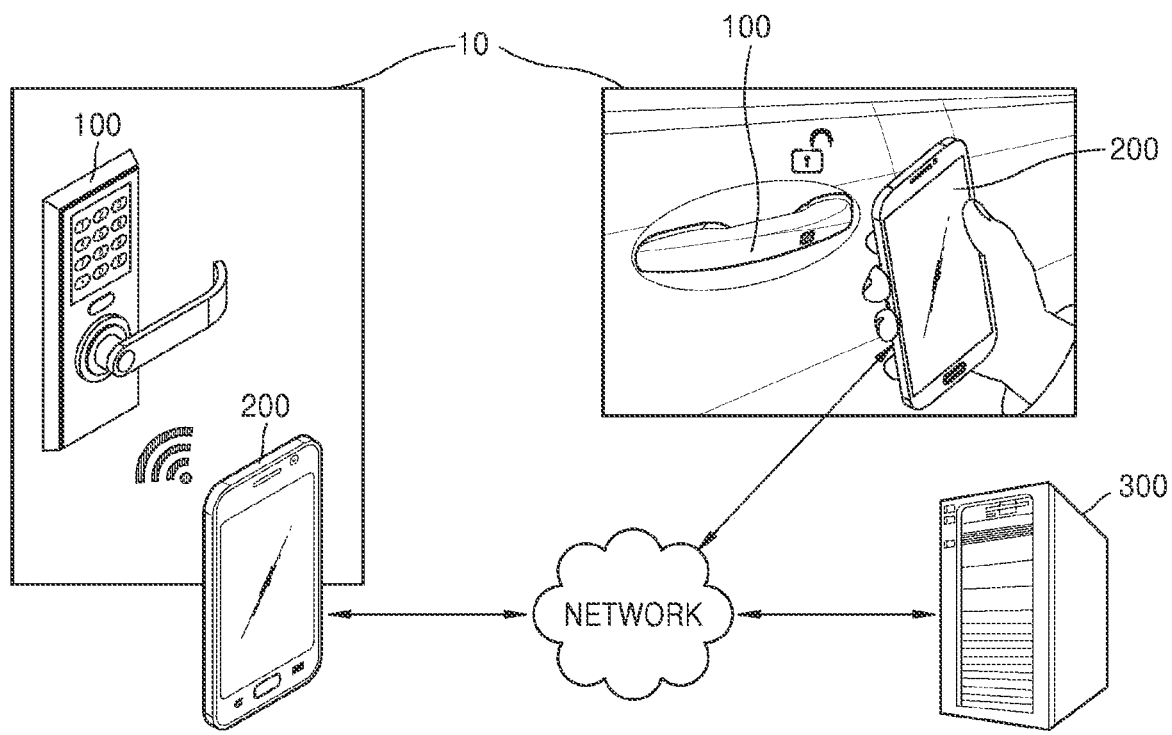
FIG. 1 is a schematic diagram of a system for authenticating an electronic device, according to an embodiment of the present disclosure.

An operating method of an electronic device, according to an embodiment of the present disclosure, may be provided. An operating method of an electronic device, according to an embodiment of the present disclosure, may include: receiving, from a server, a device certificate including a first scrambled timestamp sequence (STS) code encrypted by a public key of the electronic device and a second STS code encrypted by an STS key; transmitting the device certificate to a target device; obtaining the first STS code by decrypting the encrypted first STS code by using a secret key of the electronic device; and performing secure ranging with the target device by using the first STS code.

The device certificate according to an embodiment of the present disclosure may further include at least one of role information relating to a device authority authenticated through the device certificate and duration information relating to a duration during which the device certificate is valid.

The receiving of the device certificate, according to an embodiment of the present disclosure, may include: transmitting, to the server, a certificate signing request (CSR) including role information of the electronic device with respect to the target device, based on a user input; and receiving the device certificate from the server in response to the CSR.

The first STS code and the second STS code, according to an embodiment of the present disclosure, may be a same STS code.

The secure ranging with the target device may be performed by using ultra-wideband (UWB).

The electronic device according to an embodiment of the present disclosure may receive the device certificate from the server through an application that is executed on the electronic device.

The electronic device according to an embodiment of the present disclosure may transmit a CSR of the electronic device and the public key of the electronic device to the server through a kiosk, and the electronic device may receive the device certificate from the server through the kiosk.

A communication between the electronic device and the kiosk, according to an embodiment of the present disclosure, may be different from a communication method used for the secure ranging.

The device certificate according to an embodiment of the present disclosure may be signed by the server through an authentication process based on at least one of payment information of a user, CSR information, and policy information relating to an authority of the electronic device.

An operating method of a target device, according to an embodiment of the present disclosure, may be provided. The operating method of the target device, according to an embodiment of the present disclosure, may include: receiving, from an electronic device, a device certificate including a second STS code encrypted by an STS key and a first STS code encrypted by a public key of the electronic device; obtaining the second STS code by decrypting the encrypted second STS code by using the STS key; and performing secure ranging with the electronic device by using the second STS code.

The device certificate according to an embodiment of the present disclosure may further include at least one of role information relating to a device authority authenticated through the device certificate and duration information relating to a duration during which the device certificate is valid.

The target device according to an embodiment of the present disclosure may authenticate the device certificate; and detecting, based on the device certificate, at least one of role information relating to a device authority authenticated through the device certificate and duration information relating to a duration during which the device certificate is valid.

The target device according to an embodiment of the present disclosure may match at least one of the detected duration information and the detected role information with policy information relating to an authority of the electronic device.

The first STS code and the second STS code, according to an embodiment of the present disclosure, may be a same STS code.

The target device according to an embodiment of the present disclosure may be a device that controls an entrance gate, and the performing of the secure ranging may include: determining a distance by using UWB; and determining whether to open or close the entrance gate based on the determined distance.

The determining of whether to open or close the entrance gate, according to an embodiment of the present disclosure, may include determining to open the entrance gate when the determined distance is less than a preset distance and the first STS code matches the second STS code.

An operating method of a server, according to an embodiment of the present disclosure, may include: receiving, from an electronic device, a CSR including role information of the electronic device with respect to a target device; identifying the CSR and policy information relating to an authority of the electronic device; generating, based on a result of the identifying, a device certificate including a first STS code encrypted by a public key of the electronic device and a second STS code encrypted by an STS key; and transmitting the device certificate to the electronic device.

The device certificate according to an embodiment of the present disclosure may further include at least one of role information relating to a device authority authenticated through the device certificate and duration information relating to a duration during which the device certificate is valid.

An electronic device according to an embodiment of the present disclosure may include: a communicator configured to communicate with a server and a target device; a memory configured to store at least one instruction; and at least one processor configured to control the electronic device by executing the at least one instruction. The at least one processor according to an embodiment of the present disclosure may be further configured to: receive, from the server, a device certificate including a first STS code encrypted by a public key of the electronic device and a second STS code encrypted by an STS key; transmit the device certificate to the target device; obtain the first STS code by decrypting the encrypted first STS code by using a secret key of the electronic device; and perform secure ranging with the target device by using the first STS code.

A target device according to an embodiment of the present disclosure may include: a communicator configured to communicate with an electronic device; a memory configured to store at least one instruction; and at least one processor configured to control the target device by executing the at least one instruction. The at least one processor according to an embodiment of the present disclosure may be further configured to receive, from the electronic device, a device certificate including a second STS code encrypted by an STS key and a first STS code encrypted by a public key of the electronic device; obtain the second STS code by decrypting the encrypted second STS code by using the STS key; and perform secure ranging with the electronic device by using the second STS code.

MODE OF DISCLOSURE

Hereinafter, embodiments of the present disclosure will be described with reference to the accompanying drawings, so that those of ordinary skill in the art may easily carry out the present disclosure. However, the present disclosure may be implemented in various different forms and is not limited to the embodiments described herein. In addition, in order to clearly explain the present disclosure, parts irrelevant to the description are omitted in the drawings, and similar reference numerals are assigned to similar parts throughout the specification.

Some embodiments of the present disclosure may be represented by functional block configurations and various processes. All or part of these functional blocks may be implemented in various numbers of hardware and/or software configurations that perform specific functions. For example, the functional blocks of the present disclosure may be implemented by one or more microprocessors, or may be implemented by circuit configurations for certain functions. In addition, for example, the functional blocks of the present disclosure may be implemented in various programming or scripting languages. The functional blocks may be implemented by algorithms that are executed on one or more processors. In addition, the present disclosure may employ a related art for electronic environment setting, signal processing, and/or data processing.

In addition, connecting lines or connecting members between elements illustrated in the drawings only exemplify functional connections and/or physical or circuit connections. In an actual device, a connection between elements may be represented by various functional connections, physical connections, or circuit connections that are replaceable or added.

Hereinafter, the present disclosure will be described in detail with reference to the accompanying drawings.

Throughout the specification, a scrambled timestamp sequence (STS) key and a public key and a private key of an electronic device are unique keys of each device that are granted to each device, and may be used to encrypt or decrypt data.

FIG. 1 is a schematic diagram of a system for authenticating an electronic device, according to an embodiment of the present disclosure.

Referring to FIG. 1, the system for authenticating an electronic device may include a target device 100, an electronic device 200, and a server 300.

The target device 100 may be provided in a gate of an automobile, a hotel, a house, a building, an amusement park, a ski resort, or the like. More specifically, the target device 100 may be provided in not only a vehicle door, a trunk gate, and a gas port in an automobile, but also a door 10 such as an access gate for engine start and vehicle control, and may control the opening and closing of the door 10. In addition, the present disclosure is not limited thereto, and the target device 100 may be provided in the door 10 such as a gate in a lift gate of a ski resort and may control the opening and closing of the door 10. For example, the target device 100 may be a digital door lock that controls the opening and closing of the door 10. The type of the target device 100 capable of controlling the opening and closing by using a digital key is not limited to the example illustrated in FIG. 1.

The target device 100 may perform short-range wireless communication with the electronic device 200. Specifically, examples of a short-range communication technology according to an embodiment of the present disclosure may include wireless local area network (LAN), wireless fidelity (Wi-Fi), Bluetooth, ZigBee, Wi-Fi Direct (WFD), ultra-wideband (UWB), infrared data association (IrDA), Bluetooth low energy (BLE), near field communication (NFC), etc., but the present disclosure is not limited thereto.

The electronic device 200 according to an embodiment of the present disclosure may be implemented in various forms. Examples of the electronic device 200 may include smart televisions (TVs), set-top boxes, mobile phones, tablet personal computers (PCs), digital cameras, laptop computers, desktop computers, e-book terminals, digital broadcasting terminals, personal digital assistants (PDAs), portable multimedia players (PMPs), navigations, MP3 players, and wearable devices. However, the electronic device 200 is not limited to the above-described example, and may be any device capable of communicating with the server 300 through a network and communicating with the target device 100 through short-range wireless communication. For example, the electronic device 200 may be any device capable of transmitting and receiving data for authenticating the electronic device 200 to and from the server 300 through a network.

The communication method of the network according to an embodiment of the present disclosure is not limited, and may include a communication method using a communication network (e.g., a mobile communication network, wired Internet, wireless Internet, a broadcasting network, etc.) that may be included in the network. Examples of the network may include any one or more of a personal area network (PAN), a LAN, a campus area network (CAN), a metropolitan area network (MAN), a wide area network (WAN), a broadband network (BBN), and the Internet. The network may include any one or more of network topologies including a bus network, a star network, a ring network, a mesh network, a star-bus network, and a tree or hierarchical network, but the present disclosure is not limited thereto.

The server 300 may communicate with the electronic device 200 through the network, and may be implemented as at least one computer device. The server 300 may be distributed in a cloud form, and may provide commands, codes, files, data, and the like.

Figure 2:
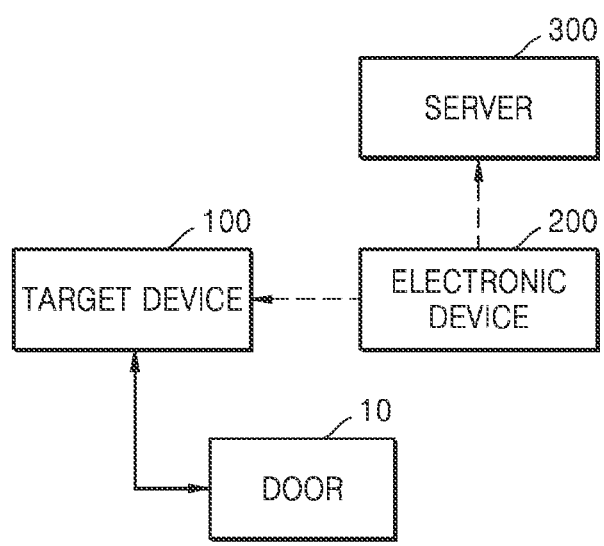
FIG. 2 is a schematic diagram illustrating a device-to-device connection for authenticating an electronic device, according to an embodiment of the present disclosure.

FIG. 2 is a schematic diagram illustrating a device-to-device connection for authenticating an electronic device, according to an embodiment of the present disclosure.

In FIG. 2, a solid line indicates a direct connection between the respective elements, and a dashed line indicates a communication connection between the respective elements. For example, a target device 100 may be directly attached to or provided on a door 10. However, the present disclosure is not limited thereto, and the target device 100 may be connected to the door 10 through communication. In addition, the target device 100 may be connected to an electronic device 200 through short-range communication, and the electronic device 200 may be connected to a server 300 through a network. In this case, the target device 100 may not communicate directly with the server 300 because only short-range communication is possible.

Hereinafter, operating methods of the target device 100, the electronic device 200, and the server 300 will be described in detail with reference to FIGS. 3 to 15.

Figure 3:
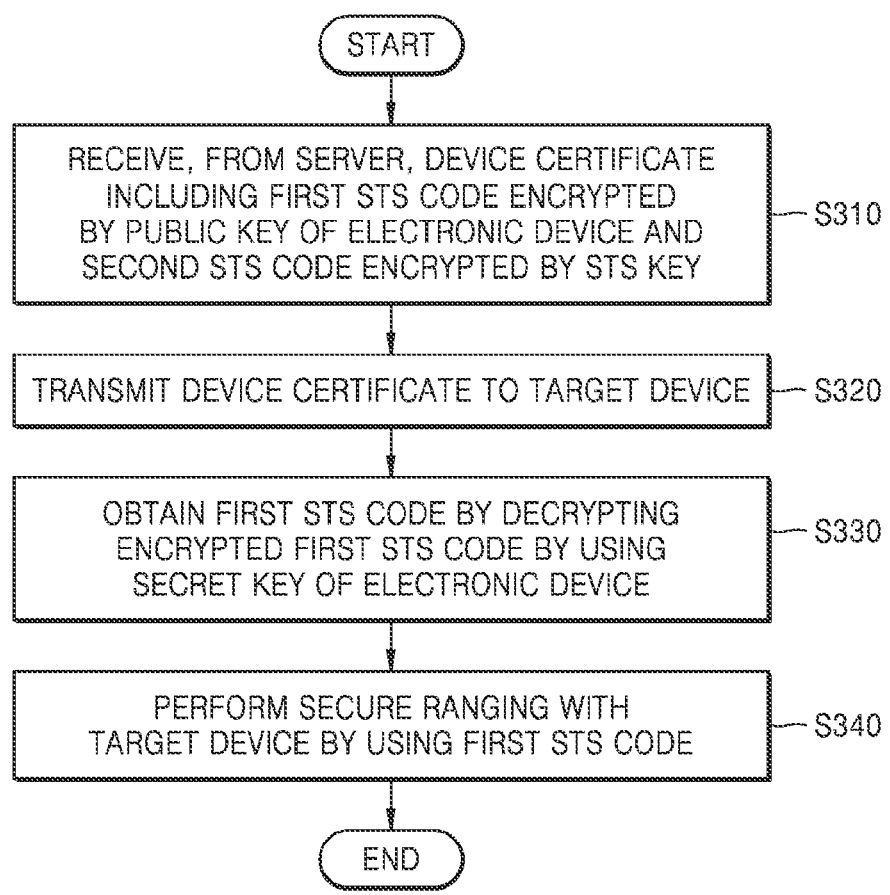
FIG. 3 is a flowchart of an operating method of an electronic device, according to an embodiment of the present disclosure.

FIG. 3 is a flowchart of the operating method of the electronic device, according to an embodiment of the present disclosure.

In operation S310, the electronic device 200 may receive a device certificate from the server 300. For example, the electronic device 200 may receive, from the server 300, the device certificate including a first STS code encrypted by a public key of the electronic device and a second STS code encrypted by an STS key.

Figure 4:
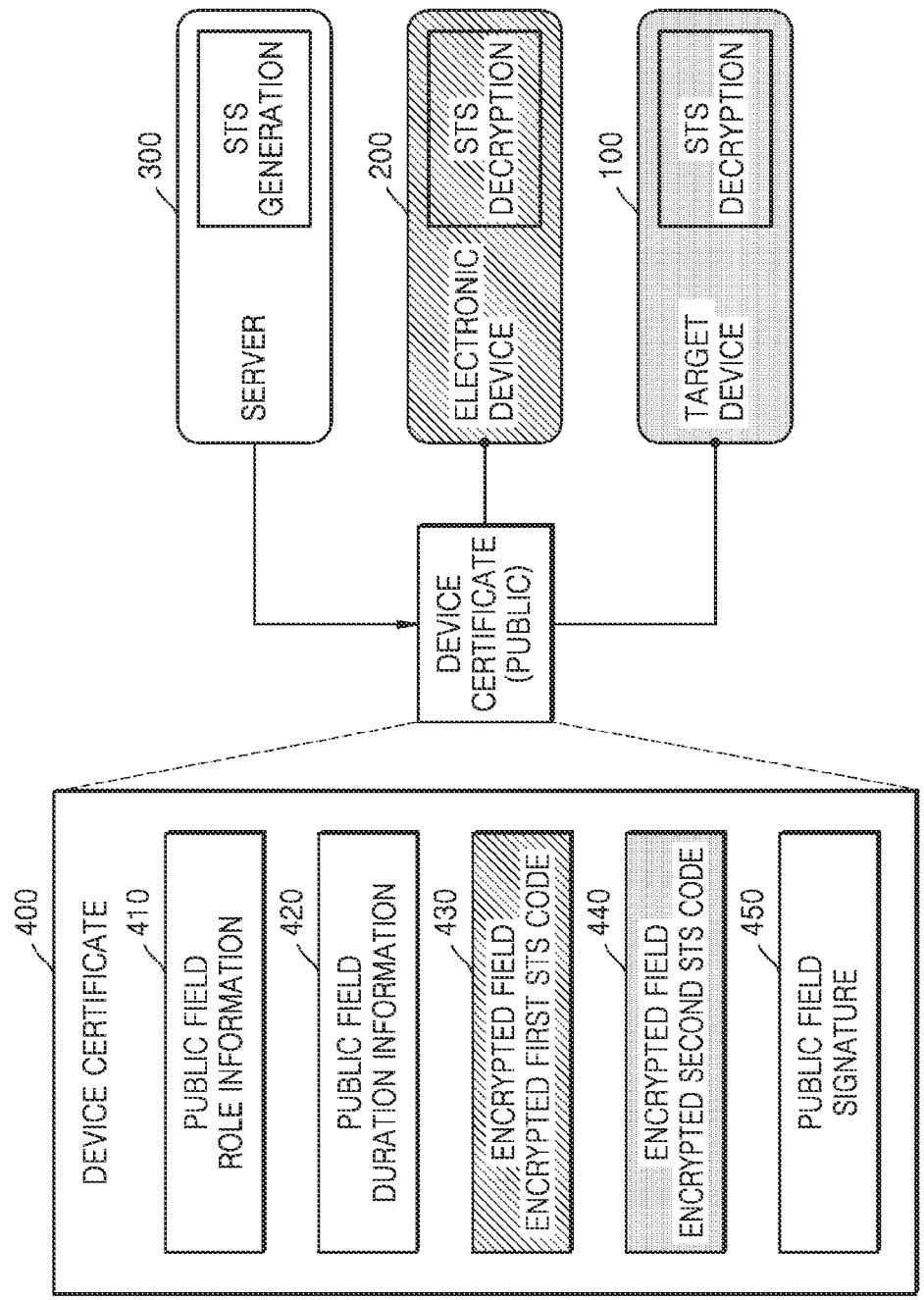
FIG. 4 illustrates a device certificate based on role (authority) information, according to an embodiment of the present disclosure.

First, the device certificate according to an embodiment of the present disclosure may correspond to a certificate based on role (authority) information. As an example, the device certificate may correspond to a device certificate 400 of FIG. 4. Referring to FIG. 4, the device certificate 400 may include an encrypted first STS code 430 and an encrypted second STS code 440.

In this case, the first STS code and the second STS code according to an embodiment of the present disclosure may correspond to the same STS code. In addition, the encrypted first STS code and the encrypted second STS code may refer to STS codes encrypted by using two different keys with respect to the same STS code. In this case, one STS code according to an embodiment of the present disclosure may be encrypted by using an STS key, and the other STS code may be encrypted by using a device key.

In the present disclosure, the first STS code may correspond to a code to be encrypted by using a public key of the electronic device 200. In addition, the encrypted first STS code may refer to a code to be decrypted by using a secret key of the electronic device 200.

In addition, the second STS code in the present disclosure may correspond to a code to be encrypted by using the STS key. In addition, the encrypted second STS code may refer to a code to be decrypted by using the STS key.

The STS key in the present disclosure may refer to a key used to encrypt and decrypt the STS code. In addition, the STS key according to an embodiment of the present disclosure may correspond to a key issued from a public key infrastructure (PKI) root 700 according to FIG. 7 to be described below. The STS key will be described in detail with reference to FIG. 7.

According to the above-described embodiment, the device certificate 400 may include the first STS code 430 encrypted by the public key of the electronic device 200 and the second STS code 440 encrypted by the STS key.

In addition, the device certificate 400 may further include at least one of role information 410 relating to a device authority authenticated through the device certificate 400 and duration information 420 relating to a duration during which the device certificate is valid.

In this case, the role information relating to the device authority authenticated through the device certificate may correspond to role information for accessing the target device 100 or controlling the target device 100.

In this case, the duration information may correspond to information relating to a duration during which the generated device certificate is valid.

According to an embodiment of the present disclosure, a signature 450 may be performed on the device certificate 400 by the server 300 through an authentication process based on at least one of payment information of a user, certificate signing request (CSR) information, and policy information.

In this case, the policy information in the present disclosure may correspond to policy information relating to the authority of the electronic device 200. More specifically, the policy information may correspond to information including at least one of information relating to the policy associated with the authority of the electronic device 200, policy information relating to a service to be provided to the electronic device 200, service information according to the authority of the electronic device 200, duration information relating to a duration during which the service is provided to the electronic device 200, amount information according to the authority and duration during which the service is provided to the electronic device 200, and internal access policy information with respect to the target device 100 based on the role information of the electronic device 200.

According to an embodiment of the present disclosure, the receiving of the device certificate may include transmitting, to the server 300, the CSR including the role information of the electronic device 200 with respect to the target device 100, and receiving the device certificate from the server 300 in response to the CSR. More specifically, the user may input access request information. In a non-limiting embodiment, the access request information may include at least one of role information and duration information.

In this case, the role information input by the user may correspond to information relating to a service to be obtained through payment or the like. In addition, the role information may correspond to information relating to a service that is obtainable through the electronic device 200.

As a non-limiting example, when the target device 100 is a gym door, the role information may correspond to information about whether the electronic device 200 of a user who uses a gym service is allowed to open the gym door. That is, the user may input a "gym one-month pass" in order to use the corresponding service. The electronic device 200 may transmit, to the server, a CSR for the "gym one-month pass" with respect to the target device 100.

In addition, the role information may be subdivided for each grade according to the policy information. As an example, the role information may be classified into a premier grade, a very important person (VIP) grade, a general grade, etc. according to a service to be provided. For example, when a user wants to receive a service for one space operated by a grade system, the user may select a grade for a desired service. Therefore, when the user selects the premium level for the above-mentioned service; the user may input "premium level" as the role information, and may input the duration information by selecting the duration of the selected role information. In the present disclosure, the role information 410 and the duration information 420 included in the device certificate 400 may correspond to information generated based on the role information and the duration information of the access request information input by the user. More specifically, when the server 300 authenticates the electronic device 200 based on at least one of the CSR information, the policy information relating to the authority of the electronic device, or the payment information of the user, the role information 410 and the duration information 420 of the device certificate 400 may correspond to information generated based on successful authentication. In addition, the role information 410 and the duration information 420 may correspond to information generated based on the role information and the duration information of the access request information input by the user.

According to an embodiment of the present disclosure, the user may input role information, duration information, and the like in an application or a kiosk executed on a mobile device. This embodiment will be described in more detail with reference to FIGS. 8, 10, and 11.

In operation 3320, the electronic device 200 may transmit the device certificate 400 to the target device 100. In this case, according to an embodiment of the present disclosure, the device certificate 400 may be transmitted in the form of a device certificate chain.

In operation S330, the electronic device 200 may obtain a first STS code by decrypting the encrypted first STS code by using the secret key of the electronic device 200.

In operation 3340, the electronic device 200 may perform secure ranging with the target device 100 by using the first STS code. According to an embodiment of the present disclosure, the electronic device 200 may perform secure ranging with the target device 100 by using UWB.

In the present disclosure, the secure ranging may refer to a process of determining a distance between the electronic device 200 and the target device 100, performing authentication of the target device 100 with respect to the electronic device 200, and controlling the target device 100. A specific operation of the secure ranging will be described below with reference to FIG. 5.

Figure 5:
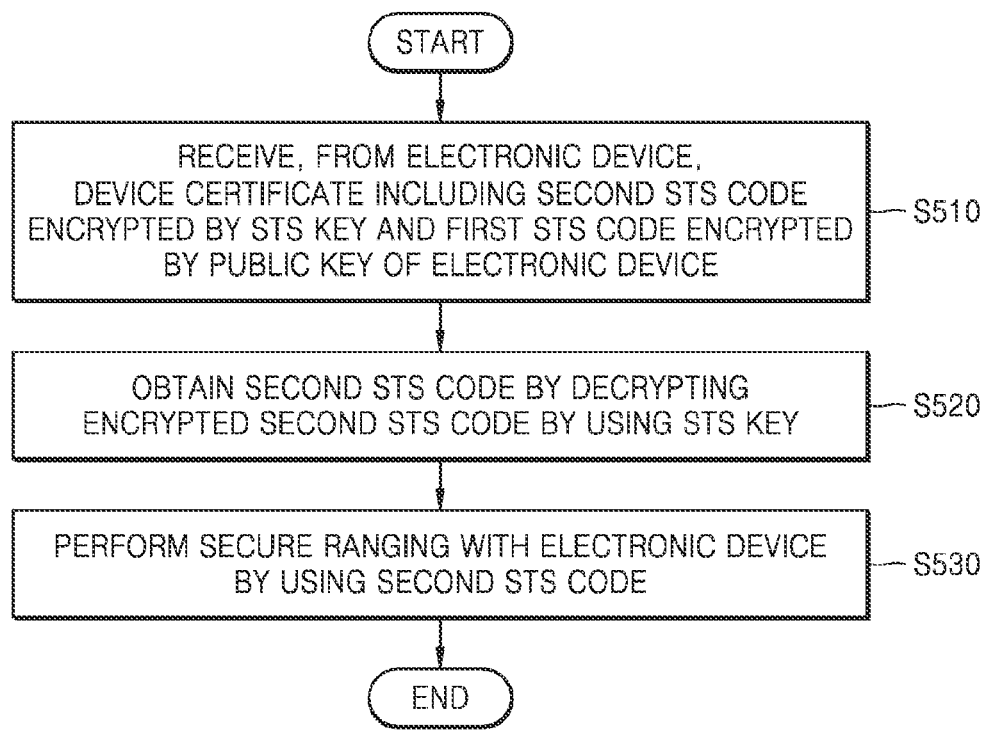
FIG. 5 is a flowchart of an operating method of a target device, according to an embodiment of the present disclosure.

FIG. 5 is a flowchart of an operating method of the target device, according to an embodiment of the present disclosure.

In operation S510, the target device 100 may receive, from the electronic device 200, the device certificate 400 including the second STS code 440 encrypted by the STS key and the first STS code 430 encrypted by the public key of the electronic device 200.

According to an embodiment of the present disclosure, the device certificate 400 may further include at least one of the role information 410 relating to the device authority authenticated through the device certificate and the duration information 420 relating to the duration during which the device certificate is valid.

According to an embodiment of the present disclosure, the target device 100 may authenticate the device certificate 400, and the target device 100 may detect at least one of the duration information 420 and the role information 410 relating to the device authority authenticated through the device certificate, based on the device certificate 400. In this case, the target device 100 may match at least one of the detected duration information 420 and the detected role information 410 with the policy information relating to the authority of the electronic device.

In operation 3520, the target device 100 may obtain the second STS code by decrypting the encrypted second STS code by using the STS key.

In operation 3530, the target device 100 may perform secure ranging with the electronic device 200 by using the second STS code. In this case, as a non-limiting embodiment, the target device 100 may be a device that controls an entrance gate.

According to an embodiment of the present disclosure, the performing of the secure ranging may include determining a distance by using UWB and determining whether to open or close an entrance gate based on the determined distance. In this case, the determining of whether to open or close the entrance gate may include determining to open the entrance gate when the determined distance is less than a preset distance and the first STS code is identical to the second STS code.

More specifically, the target device 100 may determine a distance to the electronic device 200 by using UWB. In this case, as a non-limiting embodiment, the distance may be determined based on a general ranging technique using UWB. When the determined distance to the electronic device 200 is less than a preset distance, the target device 100 may determine whether the first STS code matches the second STS code. In this case, in the present disclosure, the STS code may be used to prevent early detection (ED) and late commit (LC) attacks.

Figure 6:
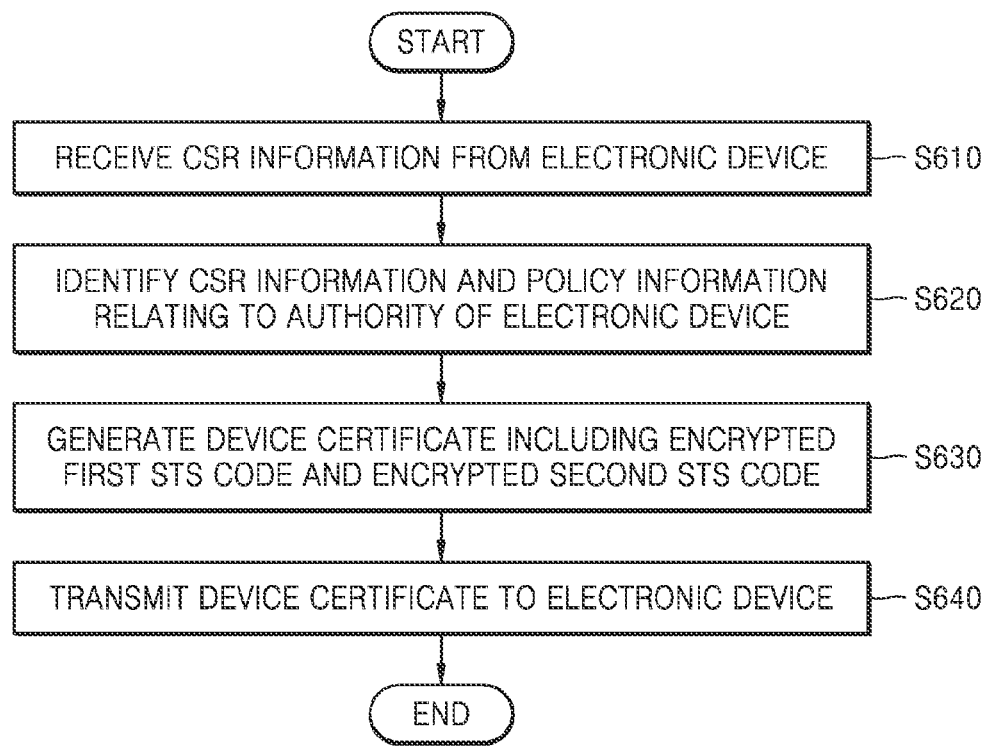
FIG. 6 is a flowchart of an operating method of a server, according to an embodiment of the present disclosure.

FIG. 6 is a flowchart of an operating method of the server, according to an embodiment of the present disclosure.

In operation S610, the server 300 may receive, from the electronic device 200, a CSR including the role information of the electronic device 200 with respect to the target device 100. More specifically, in operation S610, the server 300 may receive the CSR and the device public key from the electronic device 200.

In operation S620, the server 300 may identify CSR information and policy information relating to the authority of the electronic device. More specifically, in operation S620, the server 300 may identify the CSR information, payment information, and the policy information relating to the authority of the electronic device.

In operation S630, based on a result of the identifying, the server 300 may generate the device certificate 400 including the first STS code 430 encrypted by the public key of the electronic device and the second STS code 440 encrypted by the STS key.

In this case, according to an embodiment of the present disclosure, the server 300 may generate the first STS code and the second STS code based on a result of the identifying.

In addition, the device certificate 400 may further include the role information 410 relating to the device authority authenticated through the device certificate and the duration information 420 relating to the duration during which the device certificate is valid.

In operation S640, the server 300 may transmit the device certificate 400 to the electronic device 200. In this case, according to an embodiment of the present disclosure, the device certificate may be transmitted in the form of a device certificate chain for the device certificate.

A method of transmitting and receiving data between the server 300 and the electronic device 200 will be described in more detail with reference to FIG. 8.

Figure 7:
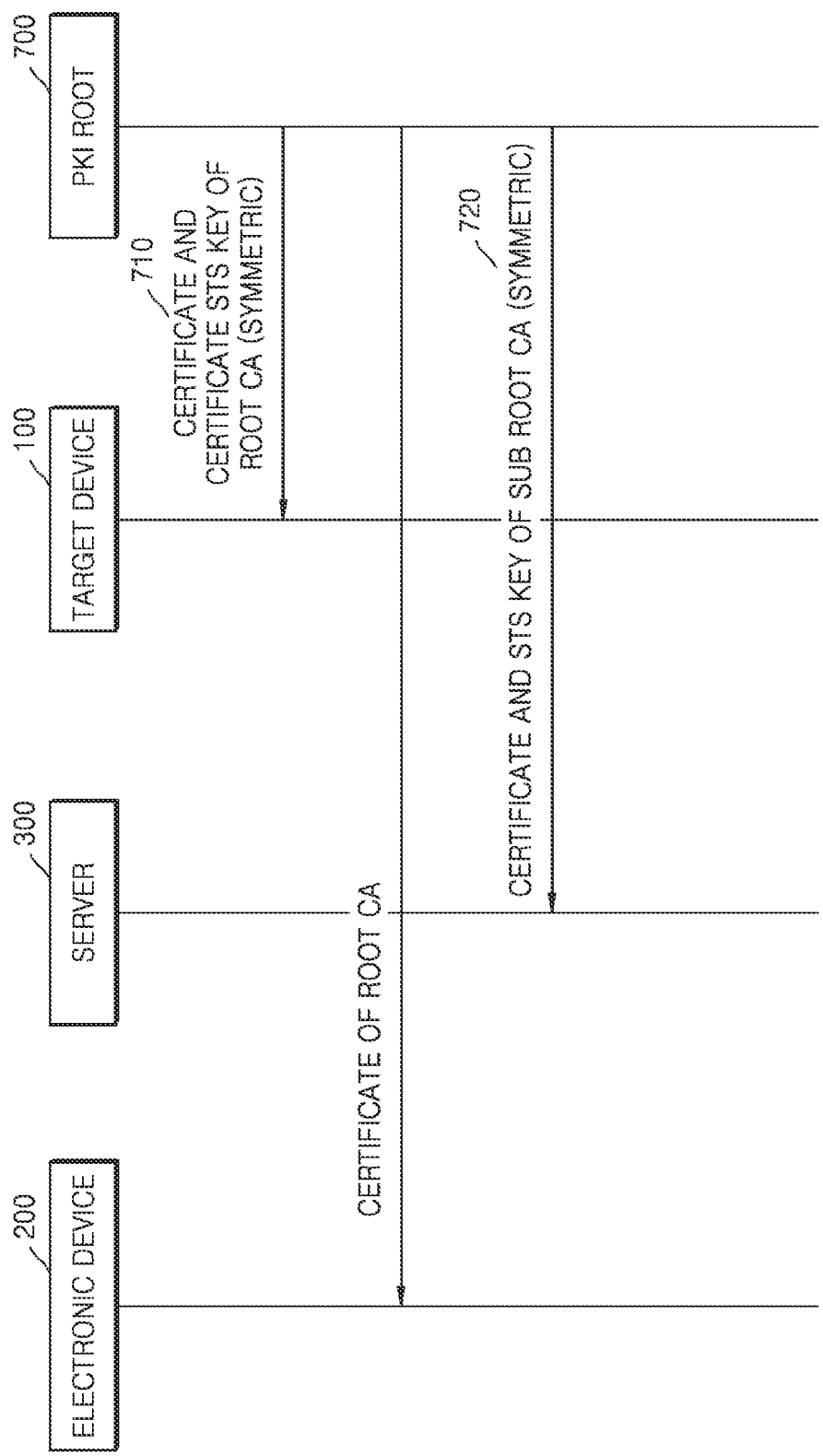
FIG. 7 is a diagram illustrating a method of transmitting and receiving data between devices, according to an embodiment of the present disclosure.

FIG. 7 is a diagram illustrating a method of transmitting and receiving data between devices, according to an embodiment of the present disclosure.

More specifically, FIG. 7 corresponds to a flowchart of a method of transmitting and receiving data between devices upon initial setting of a system, according to an embodiment of the present disclosure. That is, the data transmission and reception of FIG. 7 may be performed before the operations of FIGS. 3 to 6 of the present disclosure are performed. According to FIG. 7, information may be initially set for a target device 100, an electronic device 200, and a server 300.

First, a PKI root 700 may refer to a server of a certification authority (CA) that issues and transmits certificates of CAs to devices and servers to be authenticated in a PKI. The CA in the present disclosure may refer to an authority or a server of an authority, which provides a service for issuing and managing digital certificates for digital signature and encryption. In this case, according to an embodiment of the present disclosure, the PKI root 700 may correspond to a server of a CA corresponding to a root CA or a sub root CA. In addition, the PKI root 700 may issue an STS key to a device to be authenticated.

According to an embodiment of the present disclosure, the target device 100 may be issued a certificate of the root CA from the PKI root 700. In this case, the certificate of the root CA may include a public key of the root CA.

In this case, the certificate of the root CA may correspond to a self-signed root certificate that generally forms the basis of the PKI based on X.509. The certificate of the root CA may be trusted by all PKI-based entities.

According to an embodiment of the present disclosure, the target device 100 may be issued an STS key 710 from the PKI root 700.

According to an embodiment of the present disclosure, the electronic device 200 may be issued a certificate of the root CA from the PKI root 700. In this case, the certificate of the root CA may include a public key of the root CA.

According to an embodiment of the present disclosure, the server 300 may be issued a certificate of the sub root CA from the PKI root 700.

At this time, the certificate of the sub root CA may refer to a certificate that is signed by the certificate of the root CA, but may sign other certificates (end entities or leaf certificates) by using an extended key. The certificate of the sub root CA may protect a PKI-based system from an error caused by private key exposure. In addition, the certificate of the sub root CA may correspond to a certificate signed by the private key of the root CA.

According to an embodiment of the present disclosure, as in the target device 100 the server 300 may be issued an STS key 720 from the PKI root 700.

According to an embodiment of the present disclosure, all the STS keys may be the same as each other and may have symmetry. That is, the STS key 710 and the STS key 720 in the present disclosure may correspond to the same and symmetric keys. In addition, the STS code may be encrypted and decrypted by using the STS key. In this case, a symmetric algorithm may be used. At this time, the symmetric algorithm may include AES-256, but the present disclosure is not limited to the above-described example.

That is, according to an embodiment of the present disclosure, the second STS code may be encrypted by using the STS key 720, and the encrypted second STS code may be decrypted by using the STS key 710, For example, the STS key 710 and the STS key 720 may correspond to the same and symmetric keys.

Figure 8:
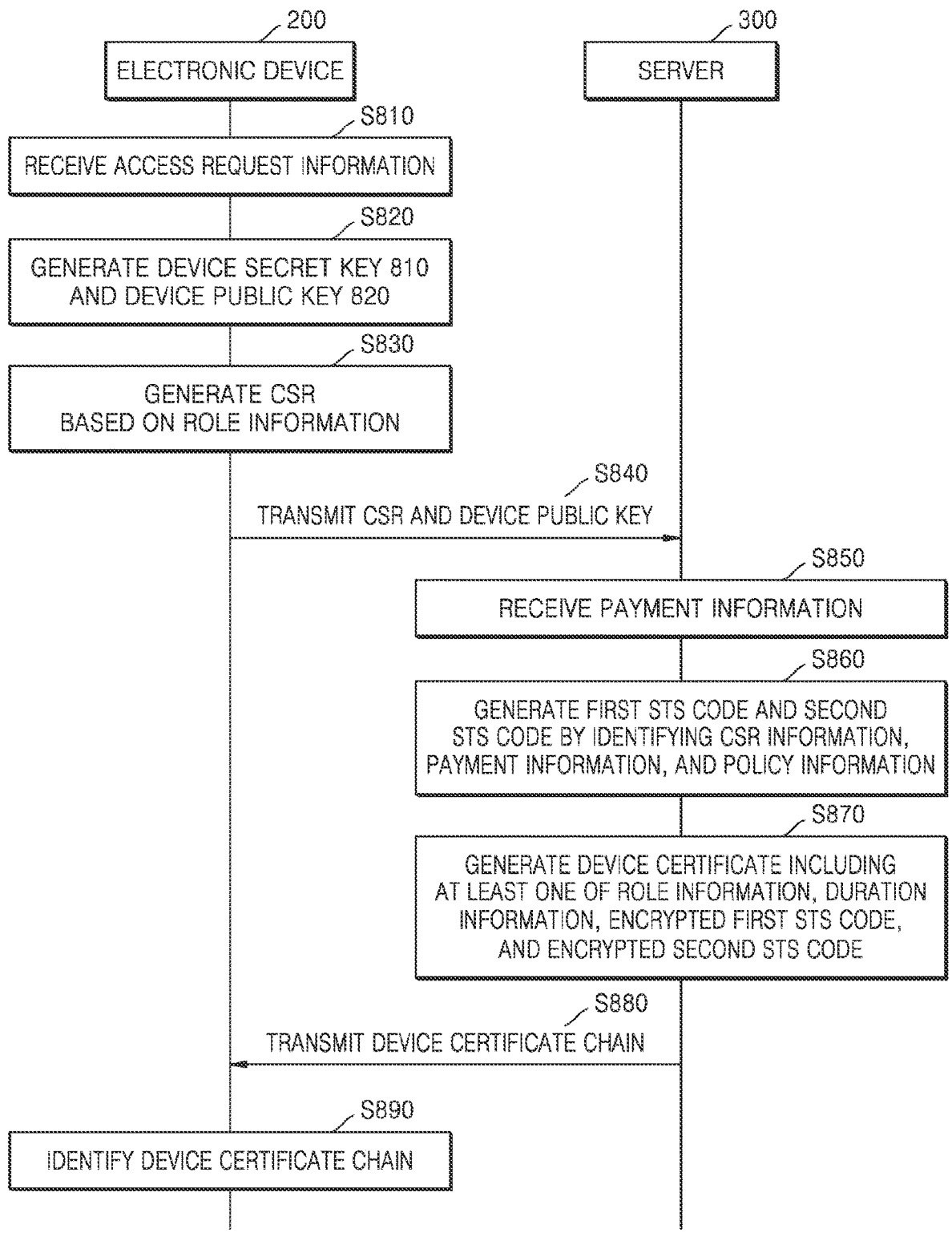
FIG. 8 is a flowchart of a method of transmitting and receiving data between an electronic device and a server according to a process of generating and transmitting a device certificate, according to an embodiment of the present disclosure.

FIG. 8 is a flowchart of a method of transmitting and receiving data between an electronic device and a server according to a process of generating and transmitting a device certificate, according to an embodiment of the present disclosure.

As an example, FIG. 8 may correspond to a diagram illustrating a method, performed by the server 300, of generating the device certificate 400 and a process, performed by the electronic device 200, of receiving the device certificate 400 from the server 300. Accordingly, FIG. 8 is a diagram for explaining the flowcharts of FIGS. 3 and 6 in more detail, and a redundant description thereof is omitted.

First, in operation 3810, the electronic device 200 may receive access request information from a user. That is, the electronic device 200 may receive, from the user, the access request information including at least one of role information and duration information. In this case, for example, the access request information may include information of a "role (authority) (open gym door) for opening a gym door" for a "service using a gym" and a "duration (valid for three months)" for the "role (authority)".

In this case, as a non-limiting example of the present disclosure, the user may input the access request information by using an application or a kiosk executed on a mobile device, and the electronic device 200 may receive the access request information input by the user. The above-described embodiment will be described in more detail with reference to FIGS. 10 and 11.

In operation S820, the electronic device 200 may generate a device secret key 810 and a device public key 820 based on the received access request information. As another example of the present disclosure, the device secret key 810 and the device public key 820 may be reused in various certificates, and may not be regenerated whenever the access request information is received.

In operation S830, the electronic device 200 may generate a CSR based on the role information. More specifically, the electronic device 200 may generate the CSR based on at least one of the role information and the duration information included in the received access request information. In this case, for example, the CSR for the access request information for the "service using a gym" described above may be generated by including the duration (valid for three months) and the authority for opening a gym door.

In operation S840, the electronic device 200 may transmit the CSR and the device public key 820 to the server 300. In addition, in operation S850, the server 300 may receive payment information. In this case, the order of operations S840 and 3850 may be changed. According to another embodiment of the present disclosure, after the server 300 receives the payment information (S850), the electronic device 200 may transmit the CSR and the device public key 820 to the server 300.

The payment information in the present disclosure may correspond to information generated when the user pays an amount corresponding to role information for the service input by the user and duration information for maintaining the authority. In this case, according to an embodiment of the present disclosure, the payment amount may be determined based on policy information.

In operation 3860, the server 300 may generate a first STS code and a second STS code by identifying the CSR information, the payment information, and the policy information relating to the authority of the electronic device.

In operation 3870, the server 300 may generate the device certificate 400 including at least one of the role information 410 relating to the device authority, authenticated through the device certificate, the duration information 420 relating to the duration during which the device certificate is valid, the encrypted first STS code 430, and the encrypted second STS code 440.

In this case, according to an embodiment of the present disclosure, the encrypted first STS code may refer to a code obtained by encrypting the first STS code by the public key 820 of the electronic device. In addition, the encrypted second STS code may refer to a code encrypted by the STS key 720.

In operation 3880, the server 300 may transmit the generated device certificate. According to an embodiment of the present disclosure, the device certificate 400 may be transmitted in the form of a device certificate chain for the device certificate. In this case, for example, the device certificate chain may be generated in such a manner that the device public key is signed by the private key of the server 300, and the public key of the server 300 is signed by the private key of the target device 100.

In operation 3890, the electronic device 200 may identify the received device certificate chain.

Figure 9:
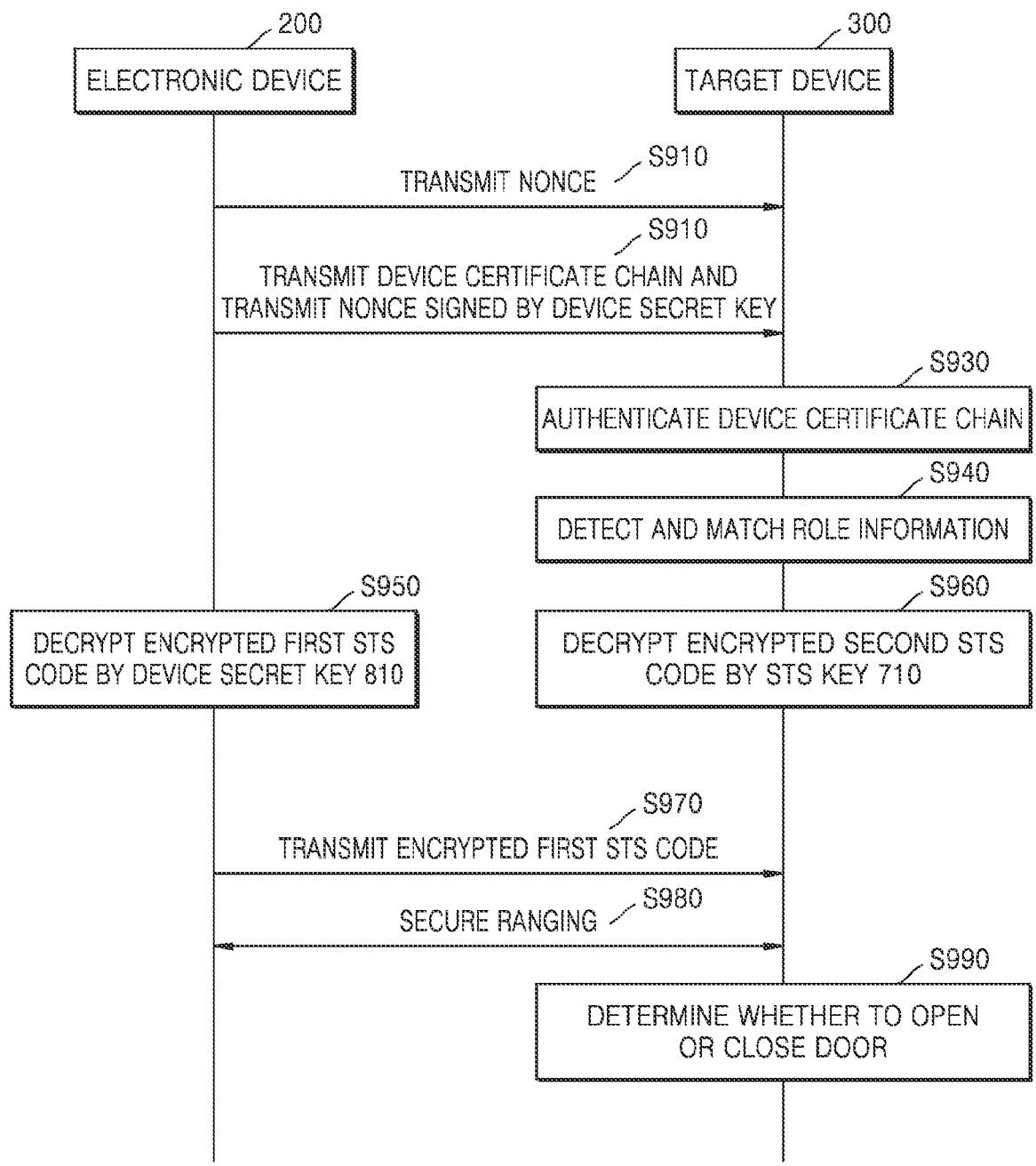
FIG. 9 is a flowchart of a method of transmitting and receiving data between an electronic device and a target device in order to perform access control, according to an embodiment of the present disclosure.

FIG. 9 corresponds to a flowchart of a method of transmitting and receiving data between an electronic device and a target device in order to perform access control, according to an embodiment of the present disclosure.

As an example, FIG. 9 is a diagram for explaining the contents described above with reference FIGS. 3 and 5 in more detail, and a redundant description thereof is omitted.

First, in operation 3910, the target device 100 may transmit a generated nonce to the electronic device 200.

In operation 3920, the electronic device 200 may transmit the device certificate 400 to the target device 100. More specifically, the electronic device 200 may transmit the device certificate chain and may transmit the nonce signed by the device secret key 810. In this case, according to an embodiment of the present disclosure, the electronic device 200 may transmit the nonce signed by the device certificate chain and the device secret key 810 by using Bluetooth, but the present disclosure is not limited thereto, and all out-of-band (OOB) channels may be used for data transmission.

In operation S930, the target device 100 may authenticate the device certificate chain. Subsequently, in operation S940, the target device 100 may detect and match the role information. More specifically, the target device 100 may obtain, from the device certificate 400, the role information 410 relating to the device authority authenticated through the device certificate 400. In addition, the target device 100 may detect the duration information 420 from the device certificate 400. The target device 100 may determine whether access policy information based on the role information previously provided to the target device 100 is matched with at least one of the obtained role information 410 and the obtained duration information 420, considering at least one of the obtained role information 410 and the obtained duration information 420.

In operation S950, the electronic device 200 may decrypt the encrypted first STS code by using the device secret key 810. In addition, in operation S960, the target device 100 may decrypt the encrypted second STS code by using the STS key 710. In this case, the STS key 710 may correspond to the STS key previously provided to the target device 100.

In operation S970, the electronic device 200 may transmit the encrypted first STS code to the target device 100.

In this case, as a non-limiting embodiment of the present disclosure, the first STS code may be encrypted by using a long term key (LTK). More specifically, in the present disclosure, the electronic device 200 may decrypt the STS code by using the key of the device. In addition, the target device 100 may decrypt the STS code by using the STS key. However, a conventional system could establish a general STS code by using a session key-based protocol. Therefore, according to the present disclosure, the same operation may be performed by using the shared LTK, instead of encrypting the STS code in the certificate twice by using different keys. Using the shared LTK, the electronic device 200 and the target device 100 may derive the same session key and then perform secure ranging according to a legacy protocol. However, a method, performed by the electronic device 200, of encrypting the first STS code and transmitting the encrypted first STS code to the target device 100 is not limited to the method using the shared LTK. In order for the target device 100 to match the second STS code with the first STS code, methods for allowing the electronic device 200 to transmit the first STS code to the target device 100 may be used in the corresponding operation.

In operation S980, the target device 100 may perform secure ranging on the electronic device 200. More specifically, the target device 100 may measure a distance between the target device 100 and the electronic device 200. When the measured distance is less than a preset distance, the target device 100 may determine whether the first STS code matches the second STS code.

In operation S990, the target device 100 may determine whether to open or close the door according to a result of the determining.

Figure 10:
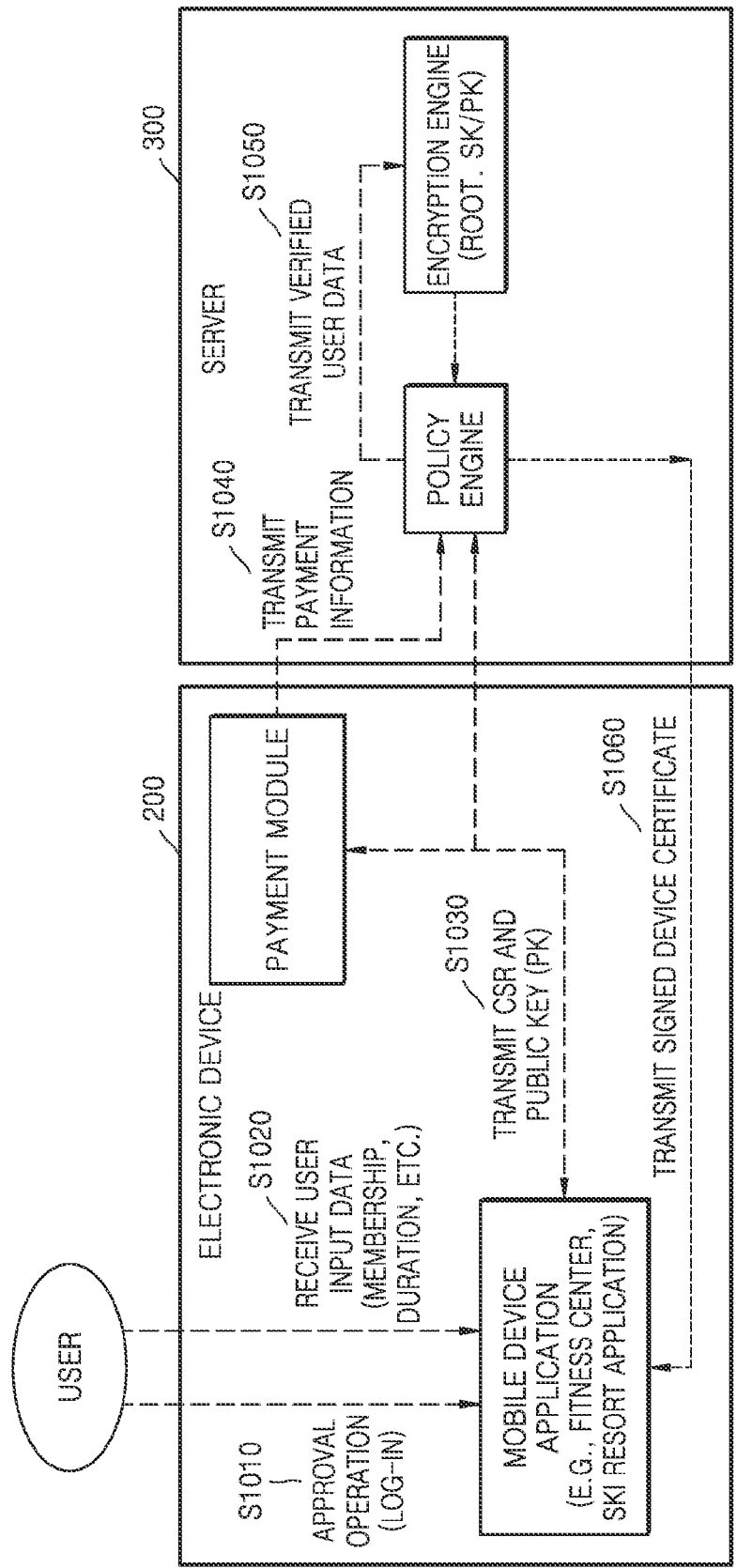
FIG. 10 is a diagram illustrating an embodiment of using a mobile application, according to an embodiment of the present disclosure.

FIG. 10 is a diagram illustrating an embodiment of using a mobile application, according to an embodiment of the present disclosure.

According to the present embodiment, the electronic device 200 may receive the device certificate 400 generated by the server 300 through the application executed on the electronic device 200. In this case, the electronic device 200 may include a mobile device application and a payment module.

In addition, the server 300 may include a policy engine and an encryption engine. According to an example of the present disclosure, the server 300 may be implemented as an authority grant backend.

First, in operation S1010, the electronic device 200 may perform an approval process through the mobile device application driven in the electronic device 200. According to an embodiment of the present disclosure, the electronic device 200 may receive log-in information from the user through the mobile device application and may perform the approval process.

In addition, in operation 51020, the user may input access request information through the mobile device application. In this case, the access request information corresponds to user input data, and may include role information and duration information. In addition, according to an example of the present disclosure, the role information may correspond to membership information or the like, as illustrated in FIG. 10. Role information according to a membership such as VIP or general for the corresponding service may be input. In addition, as a non-limiting example, the service provided by the mobile device application may include services provided at a gym (a fitness center), a ski resort, and the Ike.

In operation 31030, the mobile device application may transmit, to the payment module and the policy engine, access request information including a CSR, a public key of the electronic device 200, role information, and duration information.

In operation 51040, the payment module may generate payment information based on the received access request information. More specifically, the payment module may generate amount information corresponding to the role information and the duration information, based on the role information and the duration information that are input by the user. The user may pay the amount by using the payment module implemented in the electronic device, and the payment module may generate payment information and transmit the payment information to the policy engine.

In operation 31050, the policy engine may identify the received payment information, the CSR information, and the policy information stored in the policy engine. In addition, when the pieces of information described above are identified, the policy engine may transmit verified user data to the encryption engine.

According to an embodiment of the present disclosure, the access request information of the user, such as the duration and the membership level, may be obtained from a mobile device or a user interface. In this case, when the access request information of the user is obtained from the mobile device, the policy engine of the server 300 may identify the access request information of the user.

The encryption engine may receive the verified user data from the policy engine. That is, in this case, the encryption engine may generate the first STS code and the second STS code by identifying the received payment information, the CSR information, and the policy information stored in the policy engine. In addition, the encryption engine may encrypt the generated first STS code and the generated second STS code. In addition, the encryption engine may generate the device certificate 400 including the role information 410, the duration information 420, the encrypted first STS code 430, and the encrypted second STS code 440. In addition, the generated device certificate 400 may be signed by the authority grant backend.

In operation S1060, the signed device certificate 400 may be transmitted to the electronic device 200. In this case, according to an example of the present disclosure, the mobile device application may receive the signed device certificate 400.

Figure 11:
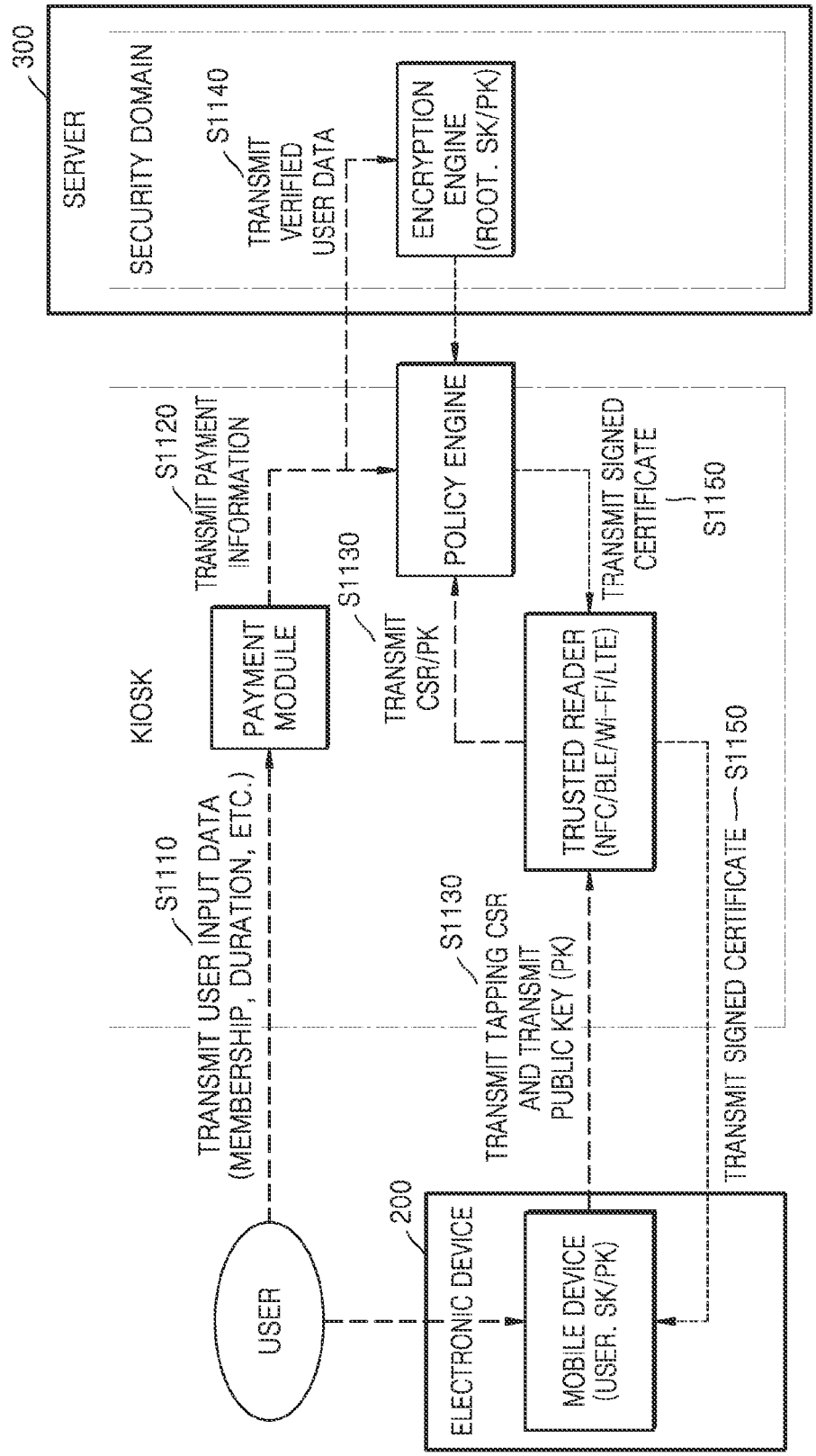
FIG. 11 is a diagram illustrating an embodiment of using a kiosk, according to an embodiment of the present disclosure.

FIG. 11 is a diagram illustrating an embodiment of using a kiosk, according to an embodiment of the present disclosure.

First, in operation S1110, the user may input access request information by using the kiosk. In addition, as described above, the access request information may include role information and duration information, and the role information may correspond to membership information on a policy for providing a corresponding service.

In operation 31120, the payment module may generate payment information based on the received access request information. More specifically, the payment module may generate amount information corresponding to the role information and the duration information, based on the role information and the duration information that are input by the user. The user may pay the amount by using the payment module implemented in the kiosk, and the payment module may generate payment information and transmit the payment information to the policy engine.

In addition, in operation 51130, the electronic device 200 may transmit the CSR of the electronic device 200 and the public key of the electronic device to the server through the kiosk. More specifically, the electronic device 200 may transmit the CSR and the public key of the electronic device to the policy engine through communication with the kiosk. In this case, a communication method different from the communication method used for secure ranging may be used for the communication between the electronic device 200 and the kiosk. In this case, according to a non-limiting embodiment, NFC, BLE, Wi-Fi, LTE, and the like may be used for the communication between the electronic device 200 and the kiosk. In addition, the electronic device 200 may be tapped to the kiosk to transmit the CSR and the public key.

In operation 51140, the policy engine implemented in the kiosk may identify the received payment information, the CSR information, and the policy information stored in the policy engine. In addition, when the pieces of information described above are identified, the policy engine may transmit verified user data to the encryption engine.

The encryption engine may receive the verified user data from the policy engine. That is, in this case, the encryption engine may generate the first STS code and the second STS code by identifying the received payment information, the CSR information, and the policy information stored in the policy engine. In addition, the encryption engine may encrypt the generated first STS code and the generated second STS code. In addition, the encryption engine may generate the device certificate 400 including the role information 410, the duration information 420, the encrypted first STS code 430, and the encrypted second STS code 440, In addition, the generated device certificate 400 may be signed by the authority grant backend.

In operation S1150, the signed device certificate 400 may be transmitted to the electronic device. In this case, according to an example of the present disclosure, the signed device certificate 400 may be received from the server 300 through the kiosk.

Figure 12:
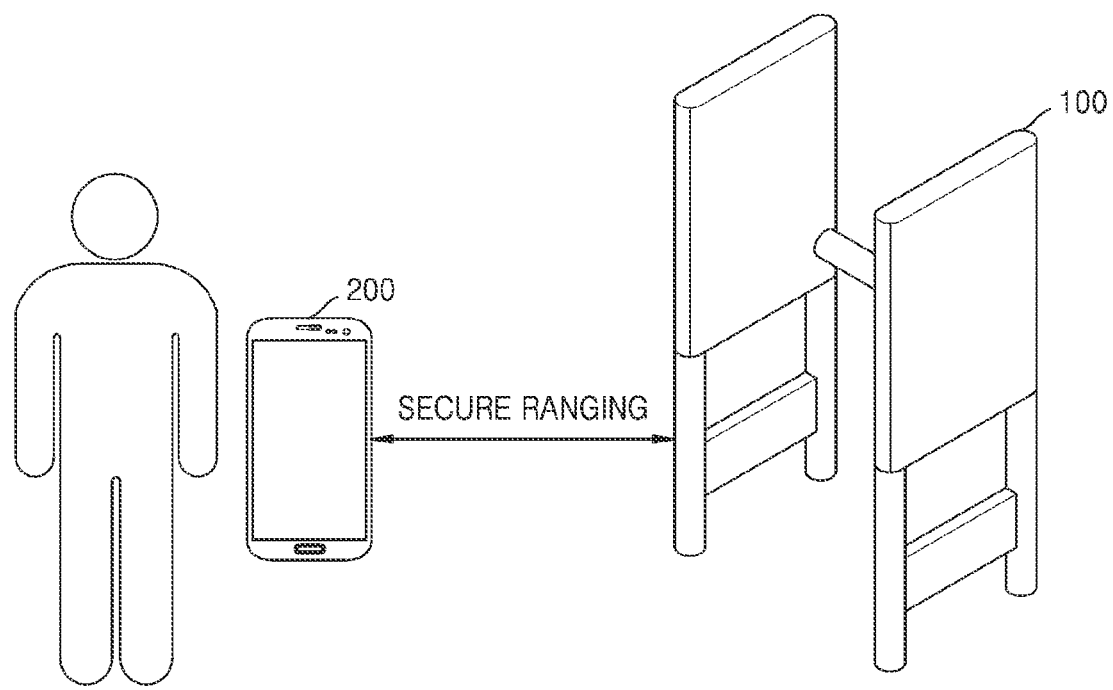
FIG. 12 illustrates an example of application to a ski-lift entrance gate, according to an embodiment of the present disclosure.

FIG. 12 is a diagram for explaining an example of application to a ski-lift entrance gate, according to an embodiment of the present disclosure.

First, according to the present embodiment, the electronic device 200 may correspond to a user's mobile device. In addition, the target device 100 may correspond to a device that controls the ski-lift entrance gate. For convenience of description, the electronic device 200 will be described as the mobile device, and the target device 100 will be described as the ski-lift entrance gate.

The user may input "ski lift pass" (role information) and duration information corresponding to information relating to a "ski lift service" in a payment counter (not illustrated), and may pay for the service. In this case, as a non-limiting example of the present disclosure, the payment counter may be implemented as a kiosk. The payment counter may generate a quick response (OR) code based on the "ski lift pass" (role information) and the duration information, and may present the OR code to the user. The mobile device may scan the OR code. The mobile device may generate a CSR and transmit the CSR to the payment counter. Based on the CSR, the payment counter may authenticate a transaction and issue a device certificate. The device certificate may be applied to all ski-lift entrance gates.

Figure 13:
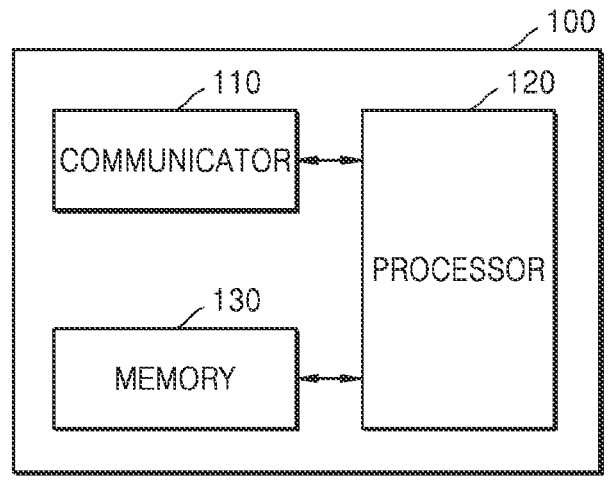
FIG. 13 is a block diagram illustrating an internal configuration of a target device, according to an embodiment of the present disclosure.

FIG. 13 is a block diagram illustrating an internal configuration of a target device, according to an embodiment of the present disclosure.

Referring to FIG. 13, a target device 100 may include a communicator 110, a processor 120, and a memory 130. However, the present disclosure is not limited thereto, and the target device 100 may include more elements or fewer elements than the elements illustrated in FIG. 13.

Although FIG. 13 illustrates that the target device 100 includes one processor, the embodiment is not limited thereto, and the target device 100 may include a plurality of processors. At least some operations and functions of the processor 120 may be performed by the processors. The target device 100 illustrated in FIG. 13 may authenticate the electronic device 200 and perform secure ranging by using the device certificate 400 based on the role information according to various embodiments of the present disclosure, and the descriptions of FIGS. 1 to 12 may be applied thereto. Therefore, redundant descriptions thereof are omitted.

The communicator 110 may perform short-range communication with the electronic device 200. To this end, the communicator 110 may include a communication module for short-range communication. For example, the communicator 110 may include a communication module that performs various short-range communications such as infrared communication, magnetic secure transmission (MST), and magnetic secure communication, in addition to Wi-Fi, Wi-Fi Direct, UWB, Bluetooth, and NFC. The communication module may be in the form of a chipset, or may be a sticker/barcode including information necessary for communication (e.g., a sticker including an NFC tag).

According to an embodiment of the present disclosure, programs such as applications and various types of data such as files may be installed on and stored in the memory 130. The processor 120 may access and use data stored in the memory 130, or may store new data in the memory 130.

In an embodiment of the present disclosure, programs and data for registering the STS key, decrypting the encrypted second STS code, authenticating the electronic device 200 by using the device certificate 400, and performing secure ranging may be installed on and stored in the memory 130.

The processor 120 may control overall operations of the target device 100 and may include at least one processor such as a central processing unit (CPU) or a graphics processing unit (GPU), The processor 120 may control other elements included in the target device 100 to perform an operation of authenticating the electronic device 200. The processor 120 may control other elements included in the target device 100 to authenticate the electronic device 200 by authenticating the device certificate 400 based on the role information and to perform secure ranging.

The processor 120 may execute programs stored in the memory 130 or an external device (not illustrated), may read files stored therein, or store new files therein.

According to an embodiment, the processor 120 may receive, from the electronic device 200, the device certificate 400 including the second STS code encrypted by the STS key and the first STS code encrypted by the public key of the electronic device. The processor 120 may obtain the second STS code by decrypting the encrypted second STS code by using the STS key. The processor 120 may perform secure ranging with the electronic device 200 by using the second STS code.

According to an embodiment, the processor 120 may authenticate the device certificate 400, and may detect, based on the device certificate 400, at least one of the role information relating to the device authority authenticated through the device certificate and the duration information relating to the duration during which the device certificate is valid.

In addition, the processor 120 may match at least one of the detected duration information and the detected role information with the policy information relating to the authority of the electronic device.

According to an embodiment, the processor 120 may determine a distance by using UWB and determine whether to open or close the target device based on the determined distance. In this case, when the target device corresponds to a device that controls an entrance gate, the processor 120 may determine a distance by using UWB and determine whether to open or close the entrance gate based on the determined distance. In addition, when the processor 120 determines whether to open or close the entrance gate, the processor 120 may open the entrance gate when the determined distance is less than a preset distance and the first STS code matches the second STS code.

Figure 14:
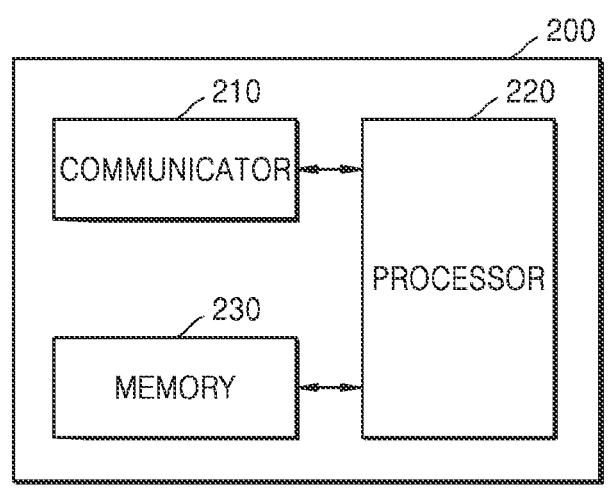
FIG. 14 is a block diagram illustrating an internal configuration of an electronic device, according to an embodiment of the present disclosure.

FIG. 14 is a block diagram illustrating an internal configuration of an electronic device, according to an embodiment of the present disclosure.

Referring to FIG. 14, an electronic device 200 may include a communicator 210, a processor 220, and a memory 230. However, the present disclosure is not limited thereto, and the electronic device 200 may include more elements or fewer elements than the elements illustrated in FIG. 14.

Although FIG. 14 illustrates that the electronic device 200 includes one processor, the embodiment is not limited thereto, and the electronic device 200 may include a plurality of processors. At least some operations and functions of the processor 220 may be performed by the processors. The electronic device 200 illustrated in FIG. 14 may authenticate the electronic device 200 and perform secure ranging by using the device certificate 400 based on the role information according to various embodiments of the present disclosure, and the descriptions of FIGS. 1 to 12 may be applied thereto. Therefore, redundant descriptions thereof are omitted.

The communicator 210 may perform wired and/or wireless communication with the server 300 through a network, and may perform short-range communication with the target device 100. To this end, the communicator 210 may include a communication module that supports at least one of various wired and/or wireless communication methods. For example, the communication module may be in the form of a chipset, or may be a sticker/barcode including information necessary for communication (e.g., a sticker including an NFC tag).

The wireless communication may include, for example, at least one of cellular communication, i-Fi, Wi-Fi Direct, Bluetooth, UWB, or NFC. The wired communication may include, for example, at least one of a universal serial bus (USB) or a high definition multimedia interface (HDMI).

In an embodiment, the communicator 210 may include a communication module for short-range communication. For example, the communicator 210 may include a communication module that performs various short-range communications such as infrared communication, MST, and magnetic secure communication, in addition to Wi-Fi, Wi-Fi Direct, UWB, Bluetooth, and NFC described above.

Programs such as applications and various types of data such as files may be installed on and stored in the memory 230. The processor 220 may access and use data stored in the memory 230, or may store new data in the memory 230.

In an embodiment of the, programs and data for storing the device secret key and the device public key, decrypting the encrypted first STS code, authenticating the electronic device 200 by using the device certificate 400, and performing secure ranging may be installed on and stored in the memory 230.

The processor 220 may control overall operations of the electronic device 200 and may include at least one processor such as a CPU and a GPU, The processor 220 may control other components included in the electronic device 200 so that the target device 100 and the server 300 authenticate the electronic device 200 by authenticating the device certificate 400. The processor 220 may control other elements included in the electronic device 200.

The processor 220 may execute programs stored in the memory 230, may read files stored therein, or store new files therein.

According to an embodiment, the processor 220 may receive, from the server, the device certificate including the first STS code encrypted by the public key of the electronic device 200 and the second STS code encrypted by the STS key. In addition, the processor 220 may transmit the device certificate to the target device. The processor 220 may obtain the first STS code by decrypting the encrypted first STS code by using the secret key of the electronic device. The processor 220 may perform secure ranging with the target device 100 by using the first STS code.

According to an embodiment, when the processor 220 receives the device certificate 400, the processor 220 may transmit, to the server 300, a CSR including role information of the electronic device with respect to the target device 100 based on a user input, and may receive the device certificate 400 from the server 300 in response to the CSR.

In addition, the processor 220 may perform secure ranging with the target device 100 by using UWB.

In addition, the processor 220 may receive the device certificate 400 from the server 300 through the application executed on the electronic device 200.

The processor 220 may transmit the CSR of the electronic device and the public key of the electronic device to the server 00 through the kiosk, and the processor 220 may receive the device certificate 400 from the server 300 through the kiosk. The processor 220 may perform communication between the electronic device 200 and the kiosk in a method different from the communication method used for secure ranging.

Figure 15:
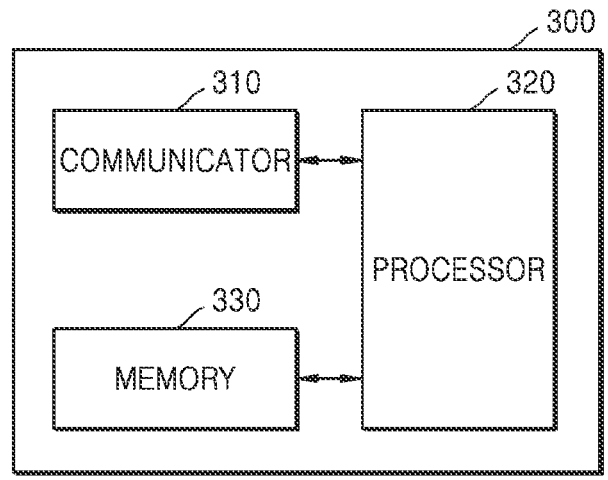
FIG. 15 is a block diagram illustrating an internal configuration of a server, according to an embodiment of the present disclosure.

FIG. 15 is a block diagram illustrating an internal configuration of a server, according to an embodiment of the present disclosure.

Referring to FIG. 15, the server 300 may include a communicator 310, a processor 320, and a memory 330. However, the present disclosure is not limited thereto, and the server 300 may include more elements or fewer elements than the elements illustrated in FIG. 15.

Although FIG. 15 illustrates that the server 300 includes one processor, the embodiment is not limited thereto, and the server 300 may include a plurality of processors. At least some operations and functions of the processor 320 may be performed by the processors. The server 300 illustrated in FIG. 15 may authenticate the electronic device 200 and perform secure ranging by using the device certificate 400 based on the role information according to various embodiments of the present disclosure, and the descriptions of FIGS. 1 to 12 may be applied thereto. Therefore, redundant descriptions thereof are omitted.

The communicator 310 may perform wired and/or wireless communication with the electronic device 200 through a network. To this end, the communicator 310 may include a communication module that supports at least one of various wired and/or wireless communication methods. For example, the communication module may be in the form of a chipset, or may be a sticker/barcode including information necessary for communication (e.g., a sticker including an NFC tag).

The wireless communication may include, for example, at least one of cellular communication, Wi-Fi, Wi-Fi Direct, Bluetooth, UWB, or NFC. The wired communication may include, for example, at least one of a USB or an HDMI.

Programs such as applications and various types of data such as files may be installed on and stored in the memory 330. The processor 320 may access and use data stored in the memory 330, or may store new data in the memory 330. In an embodiment, programs and data for registering the STS key, authenticating the electronic device 200, generating and encrypting the first STS code and the second STS code, and generating the device certificate 400 may be installed on and stored in the memory 330. The processor 320 may control overall operations of the server 300 and may include at least one processor such as a CPU and a GPU. The processor 320 may control other elements included in the server 300 to perform an operation of authenticating the electronic device 200. The processor 320 may control other elements included in the server 300 to perform an operation of authenticating the electronic device 200.

The processor 320 may execute programs stored in the memory 330, may read files stored therein, or store new files therein.

According to an embodiment, the processor 320 may receive, from the electronic device 200, a CSR including role information of the electronic device with respect to the target device. The processor 320 may identify the CSR and policy information relating to the authority of the electronic device. The processor 320 may generate a device certificate including the first STS code encrypted by the public key of the electronic device and the second STS code encrypted by the STS key based on a result of the identifying. The processor 320 may transmit the device certificate 400 to the electronic device 200.

On the other hand, the above-described embodiments may be written as a program that is executable on a computer, and may be implemented in a general-purpose digital computer that operates the program by using a computer-readable medium. In addition, the structure of the data used in the above-described embodiments may be recorded on a computer-readable medium through various means. In addition, the above-described embodiments may be implemented in the form of a computer program product including a recording medium including instructions that are executable by a computer, such as a program module that is executed by a computer. For example, the methods implemented as a software module or an algorithm may be stored in a computer-readable recording medium as codes or program commands that are readable and executable by a computer.

The computer-readable medium may be any recording media that is accessible by a computer, and may include volatile and nonvolatile media and removable and non-removable media. The computer-readable medium may include a magnetic storage medium, for example, read-only memory (ROM), floppy disk, or hard disk, and an optically readable medium, for example, compact disc read-only memory (CD-ROM) or digital versatile disc (DVD), but the present disclosure is not limited thereto. In addition, the computer-readable medium may include computer storage medium and a communication medium.

In addition, a plurality of computer-readable recording media may be distributed in network-connected computer systems, and data stored in the distributed recording media, for example, program instructions and codes may be executed by at least one computer.

Although the embodiments of the present disclosure have been described with reference to the accompanying drawings, those of ordinary skill in the art to which the present disclosure pertains will understand that the present disclosure may be embodied in other specific forms without changing the technical spirit or essential features thereof. Therefore, it should be understood that the embodiments described above are illustrative in all aspects and are not restrictive.

The invention claimed is:

1. An operating method of an electronic device, the operating method comprising:
 receiving, from a server, a device certificate including a first scrambled timestamp sequence (STS) code encrypted by a public key of the electronic device and a second STS code encrypted by an STS key;
 transmitting the device certificate to a target device;
 obtaining the first STS code by decrypting the encrypted first STS code by using a secret key of the electronic device; and
 performing secure ranging with the target device by using the first STS code.

2. The operating method of claim 1, wherein the device certificate further includes at least one of role information relating to a device authority authenticated through the device certificate and duration information relating to a duration during which the device certificate is valid.

3. The operating method of claim 1, wherein the receiving of the device certificate comprises:
 transmitting, to the server, a certificate signing request (CSR) including role information of the electronic device with respect to the target device, based on a user input; and
 receiving the device certificate from the server in response to the CSR.

4. The operating method of claim 1, wherein the first STS code and the second STS code are a same STS code.

5. The operating method of claim 1, wherein the secure ranging with the target device is performed by using ultra-wideband (UWB).

6. The operating method of claim 1, further comprising transmitting, by the electronic device, a CSR of the electronic device and the public key of the electronic device to the server through a kiosk,
 wherein the receiving of the device certificate from the server comprises receiving the device certificate from the server through the kiosk.

7. The operating method of claim 1, wherein the device certificate is signed by the server through an authentication process based on at least one of payment information of a user, CSR information, and policy information relating to an authority of the electronic device.

8. An operating method of a target device, the operating method comprising:
 receiving, from an electronic device, a device certificate including a second scrambled timestamp sequence (STS) code encrypted by an STS key and a first STS code encrypted by a public key of the electronic device;
 obtaining the second STS code by decrypting the encrypted second STS code by using the STS key; and
 performing secure ranging with the electronic device by using the second STS code.

9. The operating method of claim 8, wherein the device certificate further includes at least one of role information relating to a device authority authenticated through the device certificate and duration information relating to a duration during which the device certificate is valid.

10. The operating method of claim 8, further comprising:
 authenticating, by the target device, the device certificate;
 detecting, based on the device certificate, at least one of role information relating to a device authority authenticated through the device certificate and duration information relating to a duration during which the device certificate is valid; and
 matching at least one of the detected duration information or the detected role information with policy information relating to an authority of the electronic device.

11. The operating method of claim 8, wherein the first STS code and the second STS code are a same STS code.

12. The operating method of claim 8, wherein the target device is a device that controls an entrance gate, and
 the performing of the secure ranging comprises:
 determining a distance by using ultra-wideband (UWB); and
 determining whether to open or close the entrance gate based on the determined distance.

13. The operating method of claim 12, wherein the determining of whether to open or close the entrance gate comprises determining to open the entrance gate when the determined distance is less than a preset distance and the first STS code matches the second STS code.

14. An operating method of a server, the operating method comprising:
 receiving, from an electronic device, a certificate signing request (CSR) including role information of the electronic device with respect to a target device;
 identifying the CSR and policy information relating to an authority of the electronic device;
 generating, based on a result of the identifying, a device certificate including a first scrambled timestamp sequence (STS) code encrypted by a public key of the electronic device and a second STS code encrypted by an STS key; and
 transmitting the device certificate to the electronic device.

15. The operating method of claim 14, wherein the device certificate further includes at least one of role information relating to a device authority authenticated through the device certificate and duration information relating to a duration during which the device certificate is valid.

* * * * *